(12) United States Patent
Otsuki (10) Patent No.: US 6,638,434 B2
(45) Date of Patent: Oct. 28, 2003

(54) METHOD FOR AUTOMATICALLY CONTROLLING THE LEVEL OF DISSOLVED OXYGEN IN WATER BASED ON A PRESSURE TANK SYSTEM EQUIPPED WITH STERILIZER

(75) Inventor: Masayuki Otsuki, Minowa-machi (JP)

(73) Assignee: Kabushiki Kaisha Mikasa, Nagano (JP)

( * ) Notice: Subject to any disclaimer, the term of this patent is extended or adjusted under 35 U.S.C. 154(b) by 2 days.

(21) Appl. No.: 10/013,771

(22) Filed: Dec. 11, 2001

(65) Prior Publication Data

US 2002/0070176 A1 Jun. 13, 2002

(30) Foreign Application Priority Data

Dec. 12, 2000  (JP) ........................................ 2000-377150

(51) Int. Cl.[7] .................................................. C02F 1/30
(52) U.S. Cl. ........................ 210/748; 210/758; 210/765; 422/22; 422/24
(58) Field of Search ................................ 210/748, 758, 210/765; 422/22, 24

(56) References Cited

U.S. PATENT DOCUMENTS 6,024,875 A * 2/2000 Sevic

FOREIGN PATENT DOCUMENTS

| JP | S53-56705 | 5/1978 |
|----|-----------|--------|
| JP | S55-153875 | 12/1980 |
| JP | S63-42789 | 2/1988 |
| JP | H04-81692 | 7/1992 |
| JP | H06-182170 | 7/1994 |
| JP | H10-292444 | 11/1998 |
| JP | 2990574 | 10/1999 |
| JP | 2000-185275 | 7/2000 |

* cited by examiner

Primary Examiner—Betsey Morrison Hoey
(74) Attorney, Agent, or Firm—Koda & Androlia (57) ABSTRACT

A method for automatically controlling the level of dissolved oxygen in water, including the stops of mixing air or oxygen and nitrogen gas so as to be dissolved in retained water in a closed tank. The retained water is circulated by a pressure pump, activated by a ceramic pipe and an infrared ray irradiation device and then injected into the water in the closed tank. The mixing ratio of the air or oxygen and nitrogen gas mixed with to retained water is adjusted, the pressure in the pressure tank is changed, and the injecting pressure of the gas injection nozzle is changed. Sludge or the like is removed from the water by filtering, the oxidation-reduction potential of the water is adjusted to a desired level, and the water is sterilized by an ultraviolet ray irradiation device and brought back to the closed tank.

5 Claims, 10 Drawing Sheets

Level of Dissolved Oxygen in Water Treated with Air

Fig. 3

Level of Dissolved Oxygen in Water Treated with 30% Oxygen and 70% Nitrogen

Level of Dissolved Oxygen in Water Treated
with 40% Oxygen and 60% Nitrogen

METHOD FOR AUTOMATICALLY CONTROLLING THE LEVEL OF DISSOLVED OXYGEN IN WATER BASED ON A PRESSURE TANK SYSTEM EQUIPPED WITH STERILIZER

BACKGROUND OF THE INVENTION

1. Field of the Invention

The present invention relates to a method for changing the level of oxygen or other gases dissolved in water and oxidation-reduction potential of water, and removing organic and inorganic substances contained in water and/or sterilizing bacteria contained in water in order to obtain water having a property suitable for usage in various kinds of industry.

2. Description of the Related Art

It is known that the potential of water is allowed to change through oxidation-reduction of the water, and the water is used for various kinds of industry or the like. An apparatus for the purpose is put into actual usage.

Then, the water obtained by such methods and/or apparatus is useful for the maintenance of the freshness of vegetables, and culture of agricultural products without using chemicals, and improvement in the cultural efficiency in the field of agriculture. In the field of marine products industry, the water can be efficiently used to maintain the freshness of fishery products, and to culture marine products without using chemicals.

Besides, in the field of stock raising, the water obtained with such methods and/or apparatus is effective for raising livestock without using chemicals, improving environment for the prevention of stock raising hazard, and maintaining the freshness of stock raising products. In the field of food industry, the water is useful for maintaining the freshness of food by allowing the use of oxygen-free water.

Furthermore, in the field of water purification industry, the treatment performance of drinking water and impure water is improved. Furthermore, in the field of brewing industry of alcoholic beverages, such water contributes to the improvement in the quality and productivity thereof. Still, in the field of medicine and pharmacy, the water contributes to the improvement in the efficacy of chemicals and improvement in the preventive medicine. In the manufacturing industry, the water is effective for prevention of oxidation by allowing the use of oxygen-free water as industrial water. In other fields, the water can be used in a wide range of usage for environmental improvement.

Besides, if treated water with the level of oxidation-reduction potential changes as mentioned above are free of organic and inorganic substances and bacteria, the usage thereof will be widened.

It is also known that feeding air into water and/or applying a sound wave to the water changes the level of oxidation-reduction potential of the water.

Figure 6:
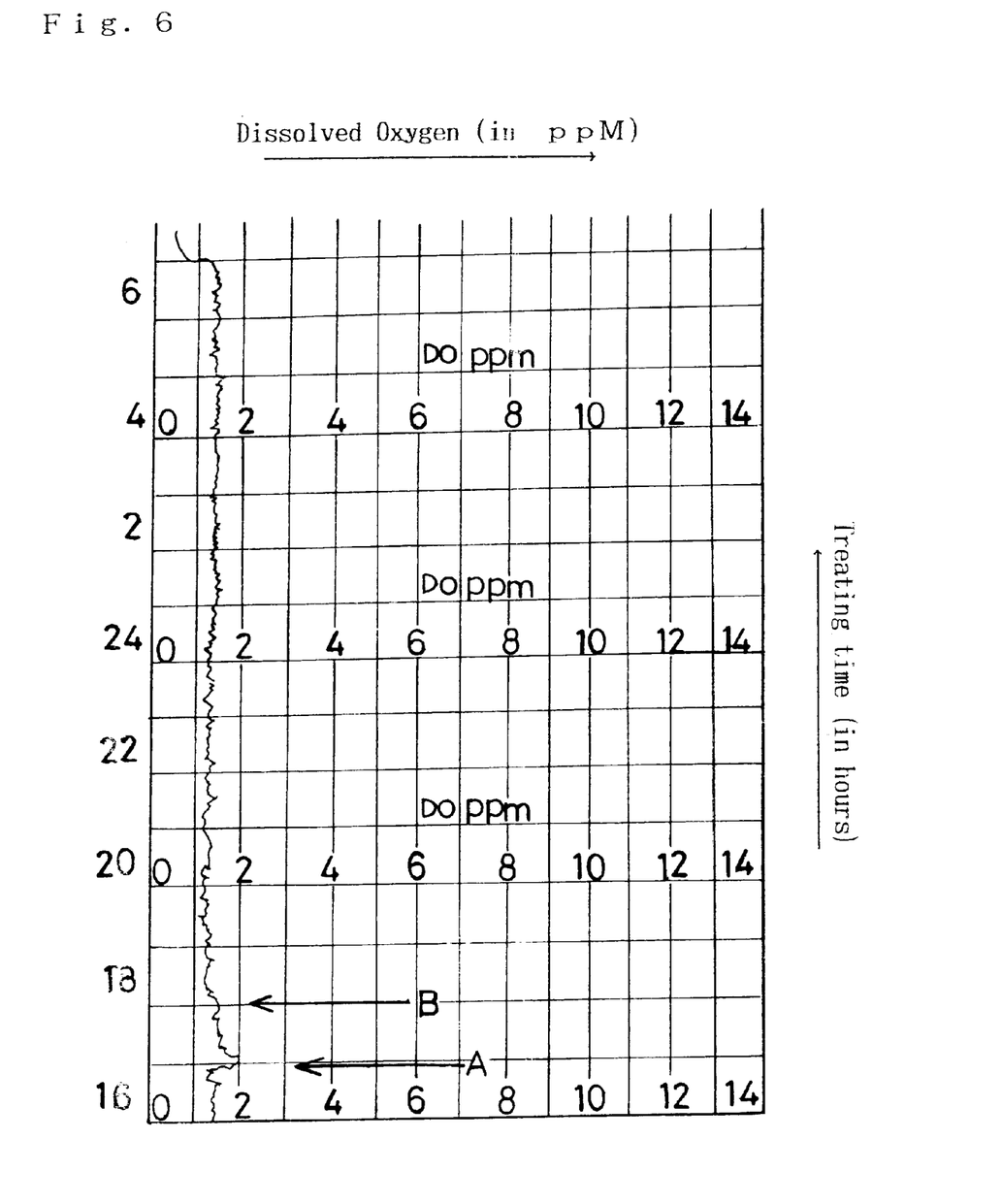
FIG. 6 is a graph showing a level of dissolved oxygen in the water treated by injecting $N_2$ gas into the water using the aeration method.
Figure 7:
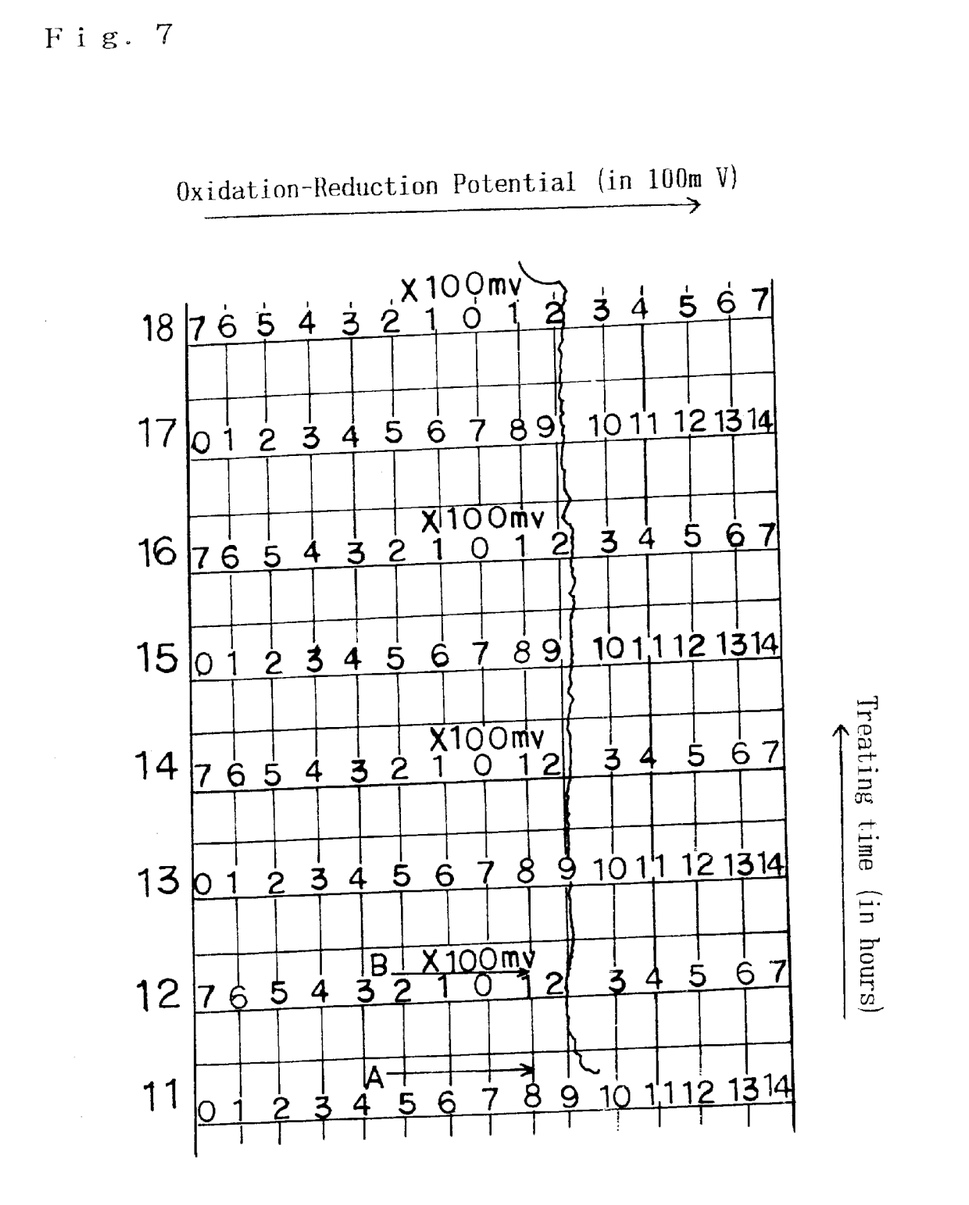
FIG. 7 is a graph showing the level of oxidation-reduction potential of the water treated by injecting $N_2$ gas into the water using the aeration method.

Furthermore, it is also known that injection of $N_2$ gas in the water using the aeration method changes the level of oxidation-reduction potential of the water. FIG. 6 shows a change in the level of oxygen dissolved in the water thus obtained. In this figure, the vertical axis shows time (in hours), and the lateral axis shows the level of dissolved oxygen (DO) in the water (in PPM). Furthermore, FIG. 7 shows a change in the level of oxidation-reduction potential of the same water. The vertical axis shows time (in hours), and the lateral axis shows the level of oxidation-reduction potential (in 100 mV). Both in FIGS. 6 and 7, the injection of $N_2$ gas starts at point A and ends at point B. Thereafter, the vessel containing the water is left as it stands in an open state. These figures indicate that the levels of dissolved oxygen and of the oxidation-reduction potential changes only marginally.

Figure 8:
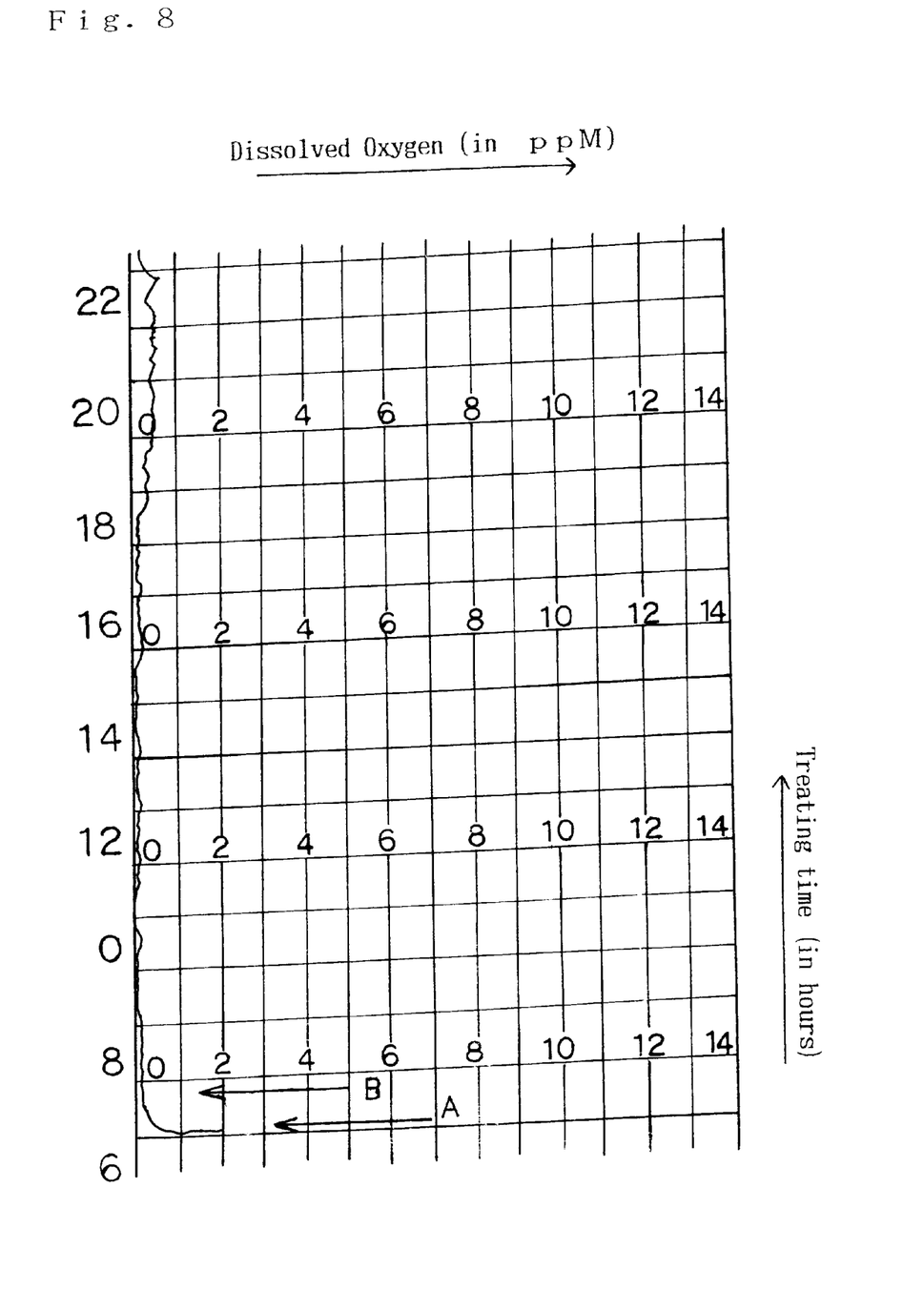
FIG. 8 is a graph showing the level of dissolved oxygen in the water treated by an apparatus of the prior art.
Figure 9:
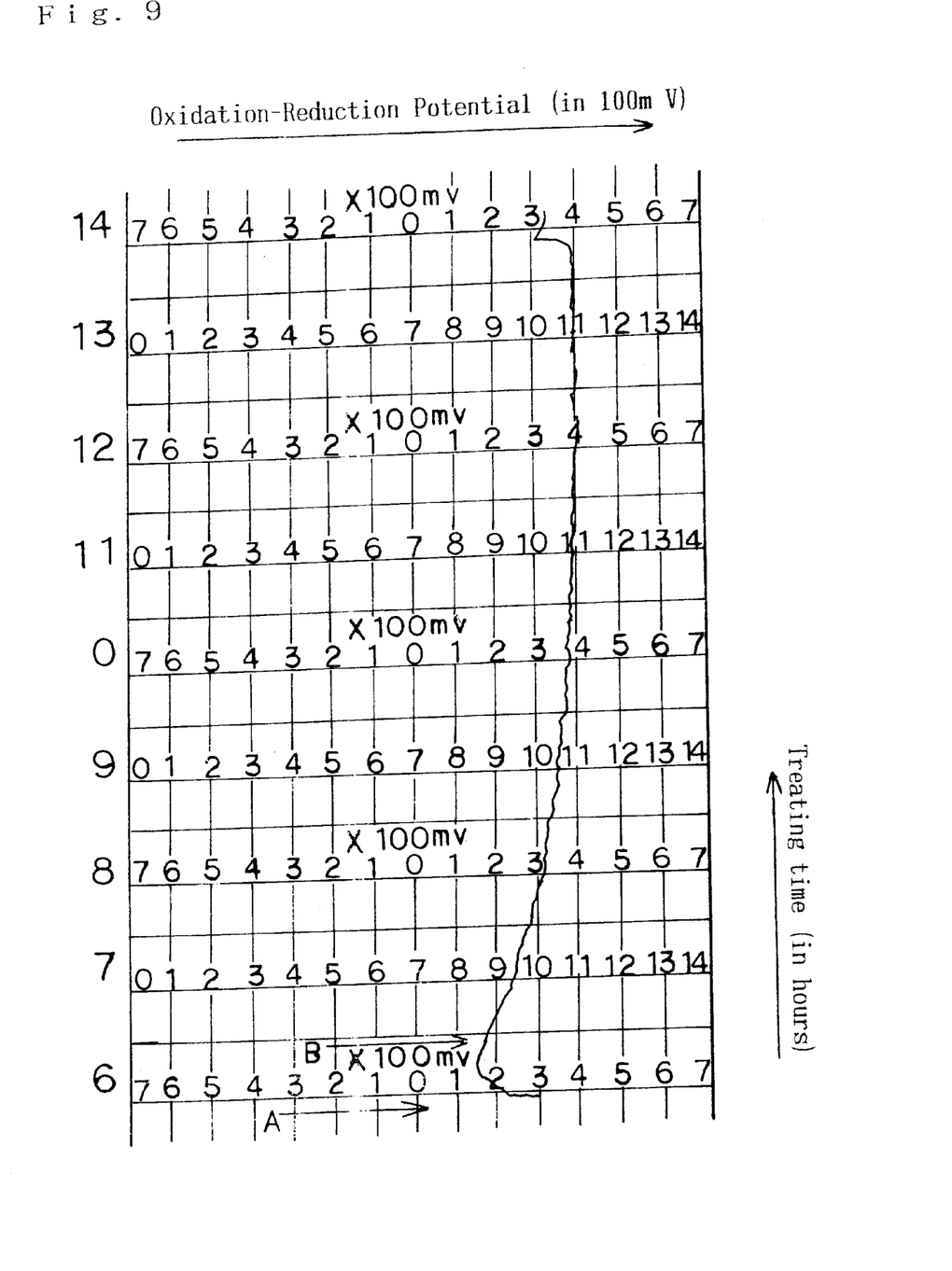
FIG. 9 is a graph showing the level of oxidation-reduction potential of the water treated by an apparatus of the prior art.

Then, in addition to injecting $N_2$ gas into water contained in a tank using the aeration method as mentioned above, an oxidation-reduction potential controller is provided to change the level of oxidation-reduction potential of water. The oxidation-reduction potential controller includes a controller for controlling the amount of air or oxygen to be injected into the water and yet another controller for controlling the level of sound wave to be applied to the water. With these controllers included, the oxidation-reduction potential controller is designed to control and adjust the said amount of the air or oxygen and the said level of sound wave simultaneously. FIGS. 8 and 9 show the changes therein thus obtained.

In FIGS. 8 and 9, the injection of $N_2$ gas starts at point A and halts at point B. Thereafter, a vessel containing the water is left as it stands in an open state. In FIG. 8, the vertical axis shows time (in hours), and the lateral axis shows the level of dissolved oxygen (DO) in the water (in PPM). As shown in FIG. 8, the level of dissolved oxygen decreased to near zero. FIG. 9 shows the level of oxidation-reduction potential of the same water. The vertical axis shows time (in hours), and the lateral axis shows the level of oxidation-reduction potential (in 100 mV). FIG. 9 indicates that the level of oxidation-reduction potential decreases immediately after the water is treated. With the vessel left as it stands, however, it comes back to the original level and even rises to a higher level, instead of getting stabilized.

Water has the property of taking in gases, which is referred to as gas dissolution. Natural water has every gaseous constituent of air such as nitrogen, oxygen, carbon dioxide, and the like dissolved therein. Among others, it is an important property of water to take in oxygen, namely to have oxygen dissolved therein because of its biogenic implications. Existence of bacteria as well as fish, plants and animals, and human beings entirely depends on dissolved oxygen. Dissolved oxygen has also much significance for the aquatic environments including rivers, ponds, lakes, seas, and the like. If there is a decrease in the level of dissolved oxygen in these waters, red tide can break out, causing mass grave of fish and shellfish. In rivers, if the level of dissolved oxygen lowers to 2 PPM or less, fish cannot make its habitat any more.

Figure 10:
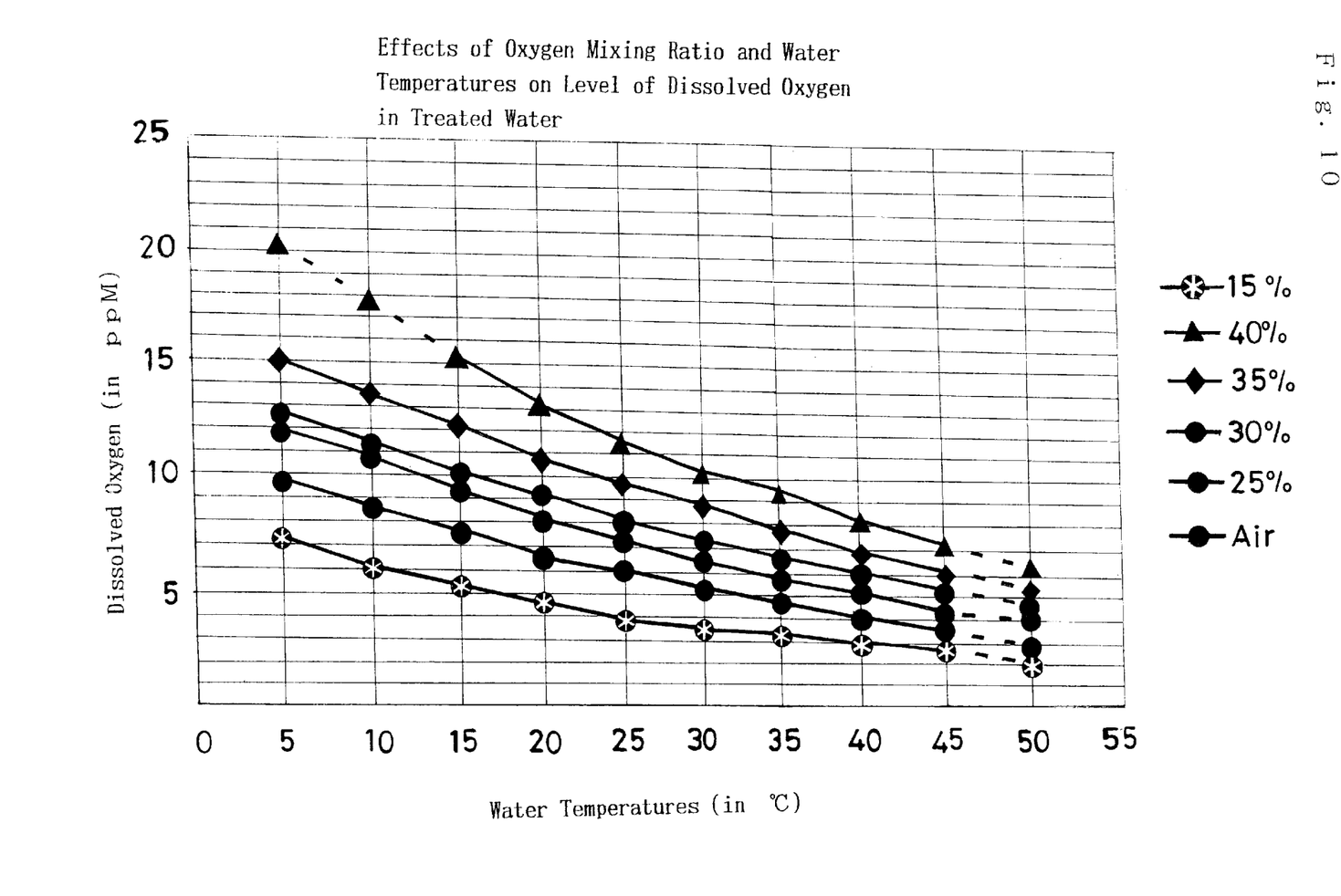
FIG. 10 is a graph showing effects of oxygen mixing ratio and water temperature on the level of dissolved oxygen in treated water.

It is true that water temperature has a large effect on the level of oxygen dissolved in water At low water temperatures, the level of oxygen dissolved in water is larger, while at high water temperatures, it is lower, as shown in FIG. 10. In this figure, the lateral axis shows water temperature (in ° C.), and the vertical axis shows the level of dissolved oxygen (in PPM). Changing a partial pressure of oxygen in gas that comes in contact with water also causes a change in the level of dissolved oxygen. Changing an oxygen ratio in the gas can also change such level. Furthermore, it is known that some other changes in conditions have the same effect. For example, if water temperature is constant, the level of dissolved oxygen should remain constant. In natural water, however, there are observed changes in the level of dissolved oxygen for some unknown reason. A presumable explanation of this might be the effects of its crystal structure, i.e., clusters. Some component parts of the structure are more likely to take in oxygen, and others are not. It follows that it requires to control water temperature, oxygen pressure, oxygen ratio, and clusters (i.e., the crystal structure of water) in order to control the level of oxygen dissolved in natural water.

As stated above, the prior art provides an apparatus for obtaining water having a desired level with respect to either dissolved oxygen (DO) or the oxidation-reduction potential. However, the prior art provides no apparatus to meet the need to obtain water having a desired level for both of them. It may be safely said that there have yet been no methods for controlling the level of dissolved oxygen with accuracy and at a moderate cost in spite of its importance.

SUMMARY OF THE INVENTION

The applicant of this invention came up with a combination of an existing apparatus according to the prior art with a device for removing organic and inorganic substances and sterilizing bacteria contained in water. This is shown by the patent journal disclosing the Japanese patent number 2990574 issued to the same applicant. By further improving the prior art, the present invention provides a method for obtaining treated water having a desired level both for dissolved oxygen and oxidation-reduction potential. The method of the present invention is also capable of removing organic and inorganic substances contained in water and sterilizing bacterial contained therein, thereby facilitating treatment processes efficiently.

According to the present invention, the above problem can be solved by providing a method comprising the steps of:

supplying crude water to a water retention chamber of a closed type tank with an automatic water supply device to obtain a predetermined amount of retained water;

mixing air or oxygen and nitrogen gas with the retained water in the closed type tank at a predetermined mixing ratio, and simultaneously feeding the gas mixed water into a circulation channel for circulating the retained water in the closed type tank through a pressure tank by means of a pressure pump;

circulating the retained water in the closed type tank in a circulation channel by means of a circulating pump, and activating the water by means of a ceramic pipe and an infrared ray irradiation device both of which are arranged in the circulation channel, thereby injecting the resulting activated water in the retained water in the closed type tank by means of a gas injection nozzle;

adjusting the mixing ratio at which air or oxygen and nitrogen gas is mixed with the retained water in the closed type tank by means of a device for adjusting the levels of oxidation-reduction potential and dissolved oxygen according to the level detected by a sensor for detecting the levels of oxidation-reduction potential and dissolved oxygen, and changing the revolution number of the said pressure pump by means of a pump motor controller to change the pressure in the said pressure tank, and changing the revolution number of the said circulating pump to change the injection pressure of the said gas injection nozzle;

filtering sludge or the like by allowing the retained water in the closed tank to pass through a filtering device by means of filtering pump and further allowing the water to pass through a ceramic-filled device thereby adjusting oxidation-reduction potential of the water to a desired level and still further allowing the water to pass through an ultraviolet ray irradiation device for sterilization followed by bringing back the water to the closed type tank; and, taking out the treated water in the closed type tank.

Besides, according to the present invention, the above problem can also be solved by providing the above mentioned method further comprising the steps of:

taking out the treated water in the closed type tank from the outlet port of treated water in the closed type tank and leading the treated water to a storage tank, the storage tank being equipped with a liquid-level adjusting means and a water supply pump controlled by the liquid-level adjusting means to maintain the amount of to be placed in storage to a predetermined value; and, taking out the treated water from the storage tank.

Besides, according to the present invention, the above problem can also be solved by configuring the above steps so that the gas mixed water having air or oxygen and nitrogen gas mixed at a predetermined mixing ratio is sucked in the circulation channel through the use of a negative pressure in the pressure tank.

Furthermore, according to the present invention, the above problem can also be solved by configuring the above steps so that the variable nitrogen/oxygen mixing ratio method is used to control the level of dissolved oxygen.

DESCRIPTION OF PREFERRED EMBODIMENTS

Figure 11:
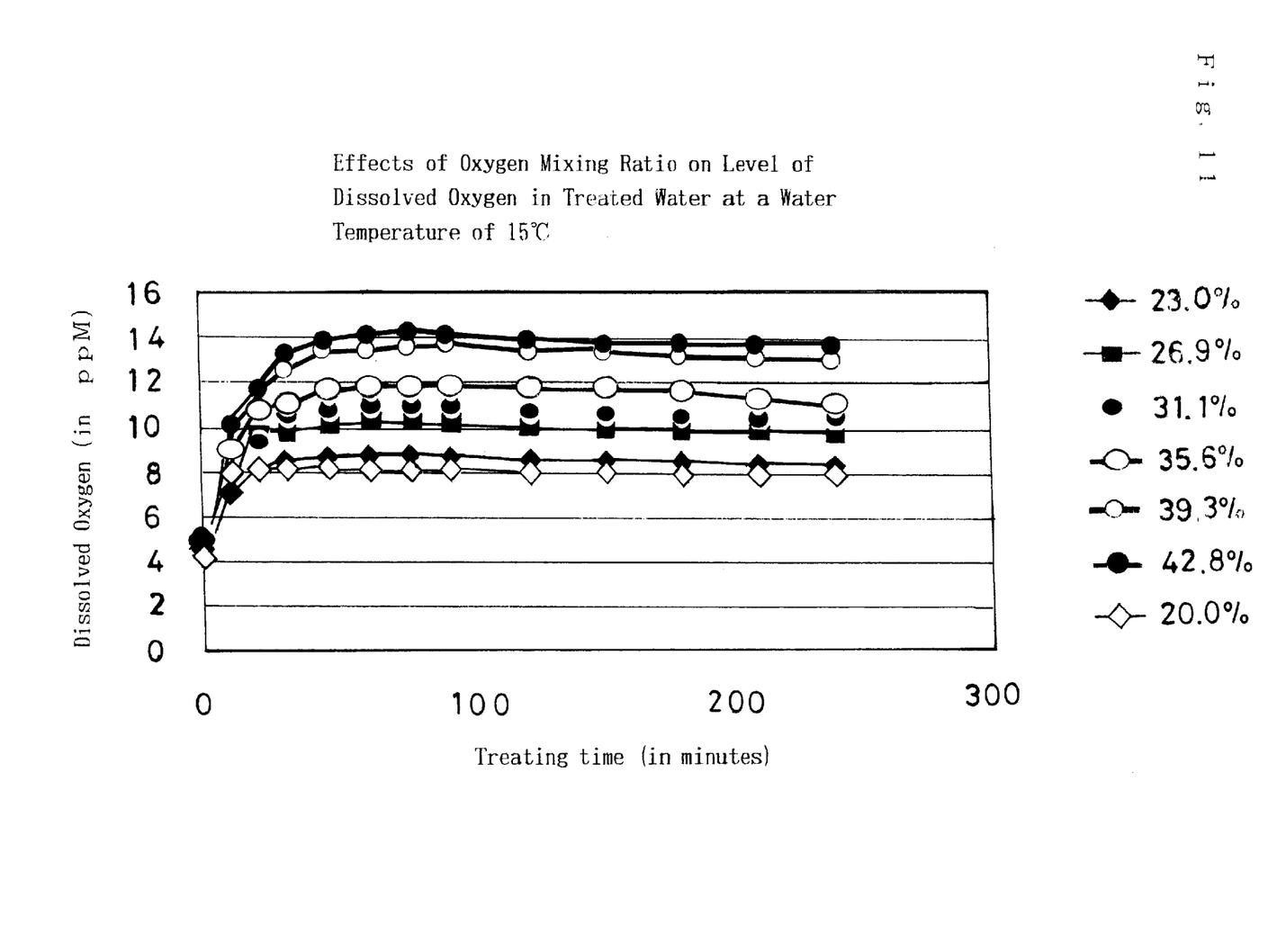
FIG. 11 is a graph showing effects of oxygen mixing ratio on the amount of dissolved oxygen in treated water at a water temperature of 15° C.

As stated above, it is known that an oxygen ratio in the gas with which water is treated has an effect on the level of oxygen dissolved in treated water. This was confirmed by artificially changing an oxygen ratio in the gas that comes in contact with water. To do this, a mixed gas composed of nitrogen gas and oxygen gas was used, and Mikasa complex sound wave generating jet-type water and gas mixer, for example, was used as a method for bringing these gases into contact with water. Water temperature is set at a fixed value (15° C.), and gas pressure is set at 1 atm. The results are shown in FIG. 11 wherein the vertical axis shows the level of dissolved oxygen (in PPM) and the lateral axis shows the time (in hours) for which the water was brought into contact with the gas. FIG. 11 indicates that although the level of dissolved oxygen varies over time, that with the elapse of a given time the level of dissolved oxygen becomes steady. In other words, the level of dissolved oxygen in water can be controlled by controlling the oxygen ratio in the gas coming into contact with water. Even with natural water, the level of dissolved oxygen can be changed by artificially changing the oxygen ratio in the air In the preferred embodiment, a pressure tank is used to dissolve gas in water. Retained water in a closed type tank for treatment is fed into the pressure tank and subsequently is brought back to the closed type tank for circulation.

In a circulation channel, a step of mixing air or oxygen and nitrogen gas at a predetermined ratio and introducing the resulting mixed gas to the water in the channel is provided. The gas mixed water is led into and pressurized in the pressure tank, thereby allowing shortened treating time and effective use of gas such as oxygen.

Introduction of mixing gas should take place at a stage just before the pressure pump being actuated and yet through the use of a negative pressure in the pressure pump, thereby assuring that mixed gas is taken in safely and positively.

In addition, the retained water in the closed type tank is circulated by means of a circulating pump in a circulation channel in which a ceramic pipe and an infrared ray irradiation device are arranged. This activates the water, and thereafter, the activated water is injected into the retained water in the tank by means of a gas injection nozzle. And there is provided a device for adjusting the levels of oxidation-reduction potential and dissolved oxygen. The device is actuated according to the level detected by a sensor for detecting the levels of oxidation-reduction potential and dissolved oxygen placed inside the disclosed type tank. The said device adjusts the mixing ratio at which air or oxygen and nitrogen gas are mixed. The device also works with a pump motor controller to change the number of revolutions of the pressure pump, thereby changing the pressure in the pressure tank, and likewise to change the number of revolutions of the circulating pump, thereby changing the injection pressure of the gas injection nozzle, thus adjusting the oxidation-reduction potential and dissolved oxygen to desired values.

To the closed type tank, another water circulation channel is connected wherein an ultraviolet ray irradiation device, a ceramic pipe, a filtering device and a filtration pump are placed. The retained water in the closed type tank is fed in the channel by means of the filtration pump, is sterilized by means of the ultraviolet ray irradiation device, and is allowed to pass through a ceramic pipe filled with ceramic powder having an adjusted value of oxidation-reduction potential, thereby adjusting oxidation-reduction potential of the water to a desired level. The water is further allowed to pass through a filtering device equipped with a bulkhead-like filter cloth, a vibrator, an air inlet pipe, a drain and the like to filter out sludge and the like.

According to the present invention, the water thus treated is led into a storage tank for temporary storage to provide for occasional use. The storage tank includes a liquid-level relay to allow it to store a required quantity of treated water at all times.

Figure 1:
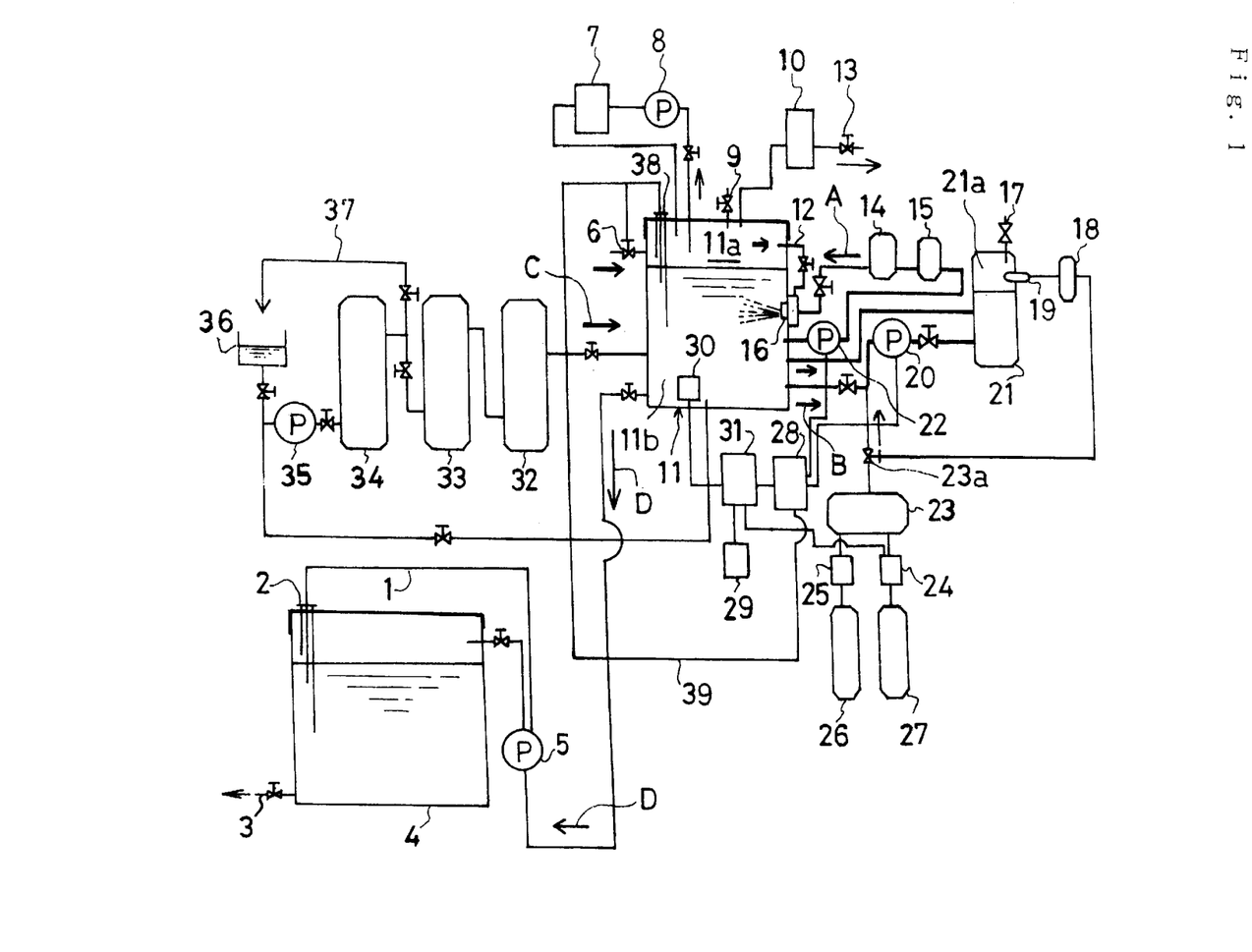
FIG. 1 is a block diagram showing the structure of one embodiment according to the present invention.

FIG. 1 is a block diagram of the structure of one embodiment of the present invention. In this figure, reference numeral 11 denotes a closed type tank. Crude water is supplied through a water valve 6. A liquid-level relay 38 measures the amount of water contained in the tank 11, and the water valve 6 is controlled according to the measured value so that a prescribed amount of water is retained in the tank 11. The inside of the closed type tank comprises the underlying water retention layer 11*b* and the superjacent gas layer 11*a*. On the side of the tank 11 corresponding to the water retention layer 11*b*, an outward channel is connected which passes through a circulating pump 22, an infrared ray irradiation device 15, and a ceramic filter 14. This allows treated water to be conveyed in the direction indicated by an arrow A by means of circulating pump 22 and to be activated by means of the infrared ray irradiation device 15 and the ceramic filter 14. Thereafter the treated water is injected into to the closed type tank 11 together with gas from an internal gas circulation channel 12 communicating with the gas layer 11*a* by means of a gas injection nozzle 16 to be brought back to the closed type tank 11.

The gas injection nozzle 16 may be an oxidation-reduction potential controlling device with an activating effect on water. Such a controlling device is referred to as the complex sound wave generating jet-type water and gas mixer, and these matters are described in the patent journal disclosing Japanese patent number 2990574 applied by and issued to the same applicant of the present invention. The water and gas mixer includes an air volume control device (not shown) that is capable of controlling the mixing ratio of air or oxygen or mixed gas of air or oxygen and nitrogen gas to be injected in the water contained in the tank. The water and gas mixer also includes a sound wave generation controlling device (not shown) that is capable of controlling the level of sound wave to be applied to the water contained in the tank. With these devices, the water and gas mixer controls and adjusts both the levels of oxidation-reduction potential of the water and of sound wave to be applied to the water.

Yet another water circulation channel is connected to the closed type tank 11. The circulation channel comprises a pressure pump 20 and a pressure tank 21, outgoing from the closed type tank 11 in the direction indicated by an arrow B. The circulation channel is constructed to have the mixed gas introduced therein. The mixed gas is produced by means of a gas mixer 23 for mixing oxygen gas fed from an oxygen gas flow controller 25 with nitrogen gas fed from a nitrogen gas flow controller 24. The former flow controller is connected to an oxygen gas generating device 26 and the latter flow controller to a nitrogen generating device 27. The mixed gas is introduced in the circulation channel at a position shortly before the pressure pump 20 so that the mixed gas is sucked in through the use of a negative pressure in the pressure pump 20.

The pressure tank 21 includes a level controller 18 equipped with a level sensor 19. The level controller 18 controls the volume of gas fed from the gas mixer 23 by means of a valve 23*a*.

Reference numeral 9 denotes a safety valve which is actuated in a dangerous situation where the gas pressure in the gas layer 11*a* located in the upper part of the closed type tank 11 exceeds a predetermined value. Furthermore, reference numeral 7 denotes a purifying device for purifying gas in the gas layer 11*a* in the upper part of the tank 1, and reference numeral 8 denotes a gas purifying pump. Gas in the gas layer 11*a* is circulated and purified by means of the purifying device 7 and the gas purifying pump 8.

Furthermore, reference numeral 10 denotes a filter, and reference numeral 13 does a surplus gas ejector, both of which are used to cope with the occurrence of surplus gas.

In this embodiment, yet another water circulation channel is connected to the tank 11, as indicated by an arrow C. In the channel, the retained water in the closed type tank 11 runs through a filter pump 35 and a filtering device 34 for filtering out sludge or the like. Then, the water passes through a ceramic pipe 33 and an ultraviolet ray irradiation device 32 for sterilization, and returns to the closed type tank 11. The filtering device 34 includes a bulkhead-like filter cloth, a vibrator, an air inlet pipe, a drain and the like all of which are omitted from the diagram. The ceramic pipe 33 is filled with powder ceramic having an adjusted level of oxidation-reduction potential, and it adjusts oxidation-reduction potential of water to a predetermined level. Reference numeral 36 denotes a ceramic tank, and reference numeral 37 denotes a ceramic-coated circuit.

The reference numeral 30 denotes a sensor for detecting the levels of oxidation-reduction potential and dissolved oxygen arranged in the vicinity of the bottom portion in the closed type tank 11. The sensor 30 detects and measures the level of oxidation-reduction potential of the retained water in the water retention layer 11b, and outputs the measured data. Reference numeral 31 denotes a device for detecting the levels of oxidation-reduction potential and of dissolved oxygen detecting device which processes the data output by the sensor 30 for detecting the levels of oxidation-reduction potential and of dissolved oxygen. Reference numeral 29 denotes an oxidation-reduction potential and dissolved oxygen recorder for recording the processed data. Finally, reference numeral 28 denotes a pump motor/liquid-level controlling circuit which controls the amount of treated water in the closed type tank 11 by means of a closed tank liquid-level controlling circuit 39 according to signals from a closed tank liquid-level relay 38. All together, the components mentioned in this paragraph comprise a device for adjusting the levels of oxidation-reduction potential and dissolved oxygen.

An arrow D denotes a channel through which completely treated water is taken out from the vicinity of the bottom part of the closed type tank 11. Such treated water is taken out and conveyed by means of a water pump 5. Reference numeral 4 denotes a storage tank for stocking treated water for occasional use. The storage tank 4 includes a liquid-level relay 2 and a liquid-level control circuit 1 for controlling the water pump 5 to maintain treated water in the storage tank 4 to a prescribed level. Reference numeral 3 denotes a water outlet port.

Incidentally, drains in the tanks and valves in communicating pipes have a known construction, and, therefore, descriptions and numbering thereof are partly omitted.

Hereinafter, a description will be given of the operation of an apparatus according to the present invention. An appropriate amount of crude water is introduced into the closed type tank 11 from a water supply valve 6 by means of a liquid-level relay 38 and is retained therein as water retention layer 11b. Crude water in the water retention layer 11b is conveyed in the direction indicated by an arrow A by means of a circulating pump 22 via a channel going through an infrared ray irradiation device 15 and a ceramic filter 14. The infrared ray irradiation device 15 and the ceramic filter 14 activates the water, and then a gas injection nozzle 16 injects the resulting activated water together with gas in the gas layer 11a located in the upper part of the closed tank 11. Thereafter, the treated water is brought back to the closed type tank 11.

Another water circulation channel is connected to the closed type tank 11. Through the channel, water in the water retention layer 11b is conveyed in the direction indicated by an arrow B by means of a pressure pump 20. At the same time, the mixed gas is introduced in a stage preceding the pressure pump 20. The mixed gas comes from a gas mixer 23 for mixing oxygen gas from an oxygen gas flow controller 25 with nitrogen gas from a nitrogen gas flow controller 24. The former flow controller is connected with an oxygen generating device 26, and the latter flow controller is connected with a nitrogen gas generating device 27. The mixed gas is introduced at a position shortly before the pressure pump 20 by being sucked in through the use of a negative pressure in the pressure pump 20.

The pressure tank 21 is provided with a liquid-level controller 18 equipped with a liquid-level sensor 19. The liquid-level controller 18 controls the amount of mixed gas supplied from the gas mixer 23 by means of a valve 23a and adjusts the pressure in the gas layer 21a in the pressure tank 21, thereby effecting pressure dissolution of oxygen in water while maintaining a prescribed level of water therein.

A sensor 30 for detecting the levels of oxidation-reduction potential and dissolved oxygen placed in the vicinity of the bottom part of the closed type tank 11 detects and measures the levels of oxidation-reduction potential and dissolved oxygen in water in the water retention layer 11b. The data thus measured is input to and processed in a device 31 for detecting the levels of oxidation-reduction potential and dissolved oxygen which, in turn, outputs data to an oxidation-reduction potential and dissolved oxygen recorder 29 for recording. The said output data is fed to a pump motor/liquid-level controlling device 28 to control the number of revolutions of the circulating pump 22, thereby changing the pressure at which air bubbles are injected by an injection nozzle. Likewise, this controls the number of revolutions of a pressure pump 20, thereby changing the pressure in the pressure tank 21.

The said output data is also fed to the nitrogen gas flow controller 24 and the oxygen flow controller 25 to control the flow rate under their respective control. This allows automatic control of the ratio of the flow rate of nitrogen gas to that of oxygen gas and thus, the use of the variable nitrogen/oxygen ratio system to control dissolved oxygen in water.

Reference numeral 9 denotes a safety valve which is actuated in a dangerous situation where the gas pressure in the gas layer 11a located in the upper part of the closed type tank 11 exceeds a predetermined value. Furthermore, reference numeral 7 denotes a purifying device for purifying gas in the gas layer 11a in the upper part of the tank 11, and reference numeral 8 denotes a gas purifying pump. Gas in the gas layer 11a is circulated and purified by means of the gas purifying device 7 and the gas purifying pump 8.

In this manner, the water retention layer 11b in the closed type tank 11 is fed with oxygen-dissolved water from the pressure tank 21 by means of the pressure pump 20. At the same time, the activated water by means of the infrared ray irradiating device 15 and the ceramic filter 14 is injected into the closed type tank 11 by means of the gas injection nozzle 16, together with gas in the gas layer 11a located in the upper part of the closed type tank 11. All together, this allows the levels of oxidation-reduction potential and dissolved oxygen in water in the closed type tank 11 gradually to get to the prescribed value.

The oxidation-reduction potential of retained water in the water retention layer 11b is recorded as time goes by means of the oxidation-reduction potential and dissolved oxygen recorder 29. The setting of the relations between the levels of oxidation-reduction potential and of dissolved oxygen, the output amount of the gas mixer 23, and other relevant values can be fine tuned on the basis of this recorded data.

On the other hand, along with the above operation, the retained water in the closed type tank 11 is taken out from the water outlet port placed in the vicinity of the bottom part of the closed type tank 11 in the direction indicated by an arrow C. The water thus taken out is sent to a filtering device 34 via a filtration pump 35 to have sludge or the like removed from it. The filtering device 34 includes a bulkhead-like filter cloth, a vibrator, an air inlet pipe, a drain and the like all of which are omitted from the diagram. The water is further passed through a ceramic pipe 33 filled with powder ceramic having an adjusted level of oxidation-reduction potential to adjust its oxidation-reduction potential to a prescribed level. The water is further conveyed to an ultraviolet ray irradiation device 32 for sterilization and thereafter is brought back to the closed type tank 11. Reference numeral 36 denotes a ceramic tank, and reference numeral 37 denotes a ceramic-coated circuit. The water thus filtered is again brought back to the closed type tank 11.

The water thus treated now has a prescribed level of oxidation-reduction and of dissolved oxygen, and is available for use by taking it out of the closed type tank via a channel as indicated by an arrow D. In other words, the treated water is taken out of the tank by means of a water pump 5 and is led into a storage tank 4 to provide for occasional use. The storage tank 4 includes a liquid-level relay 2 and a liquid-level control channel 1 to allow it to store a required quantity of treated water at all times. A necessary quantity of water is drawn from a water outlet port 3.

Figure 2:
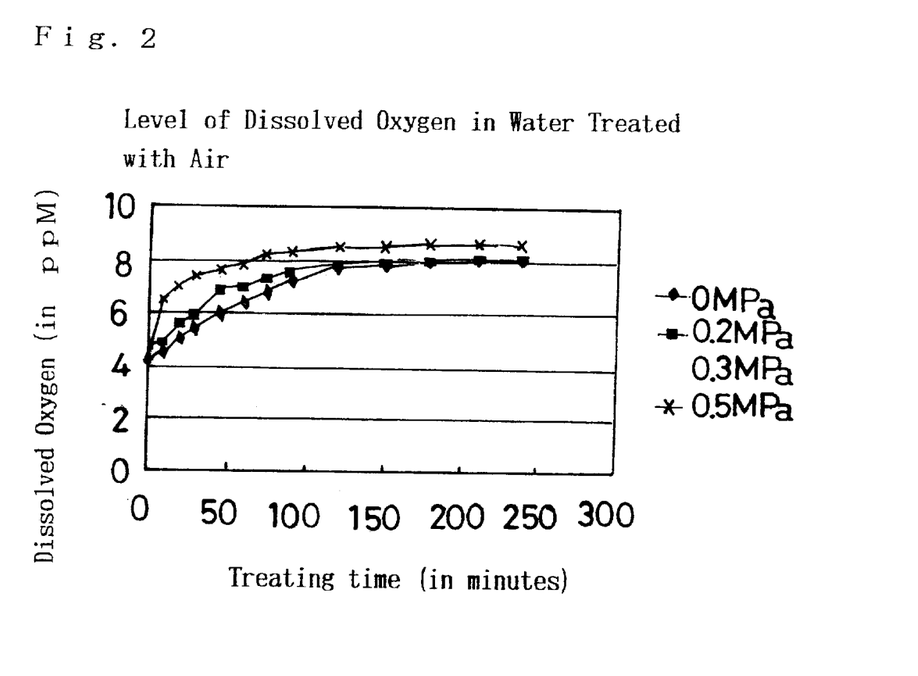
FIG. 2 is a graph showing a change in the level of dissolved oxygen in the water treated under air pressure, with no oxygen added, according to the present invention.
Figure 3:
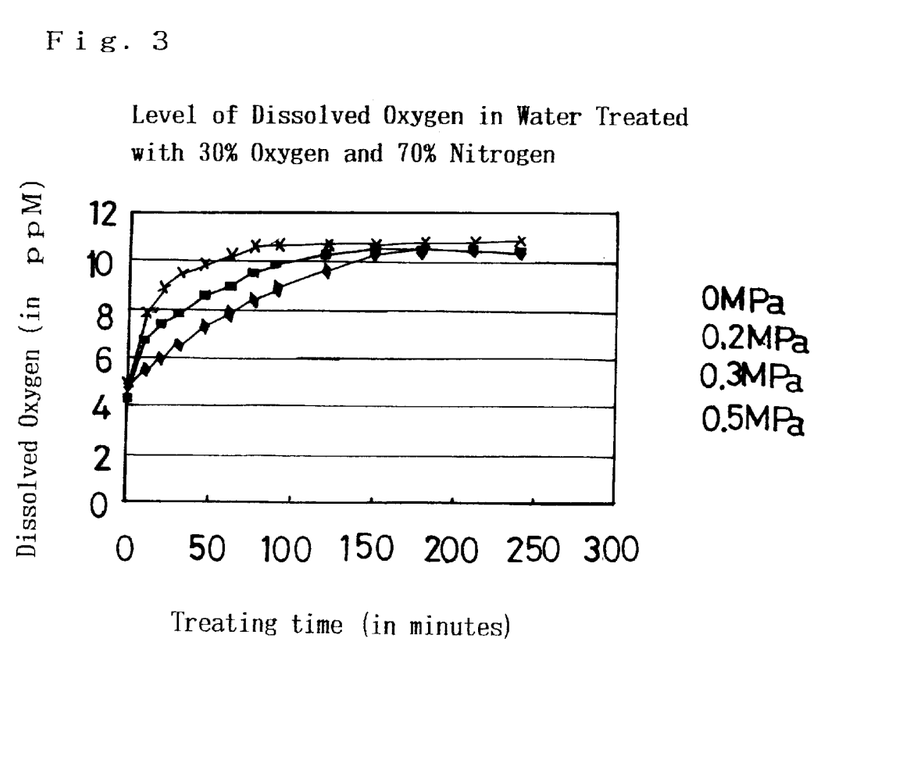
FIG. 3 is a graph showing a change in the level of dissolved oxygen in the water treated under pressure, with 30% oxygen added, according to the present invention.
Figure 4:
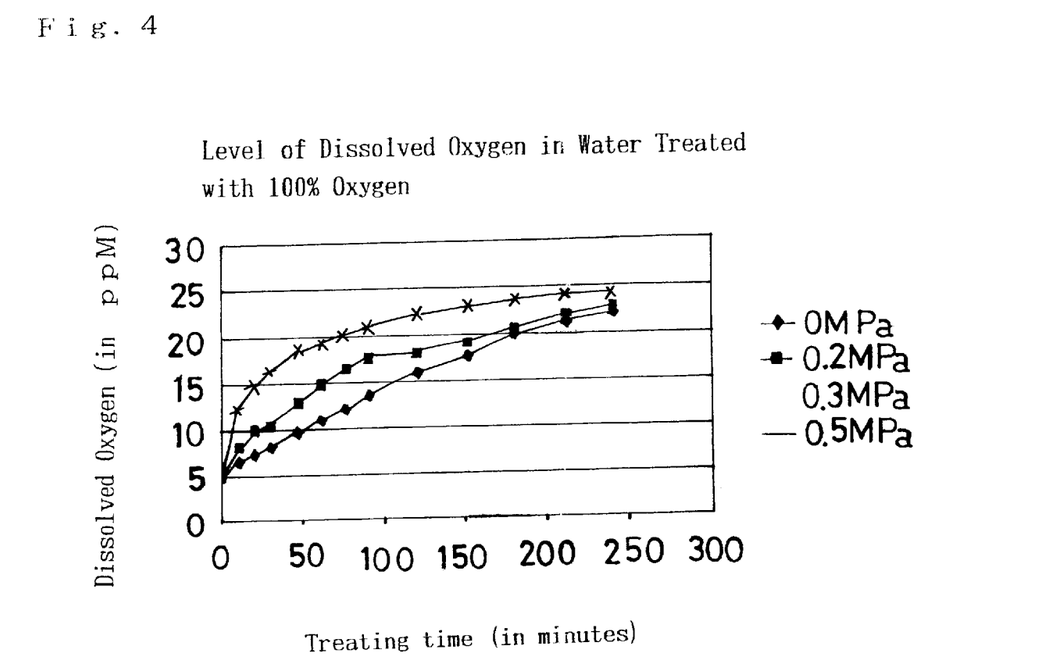
FIG. 4 is a graph showing a change in the level of dissolved oxygen in the water treated under pressure, with 40% oxygen added, according to the present invention.
Figure 5:
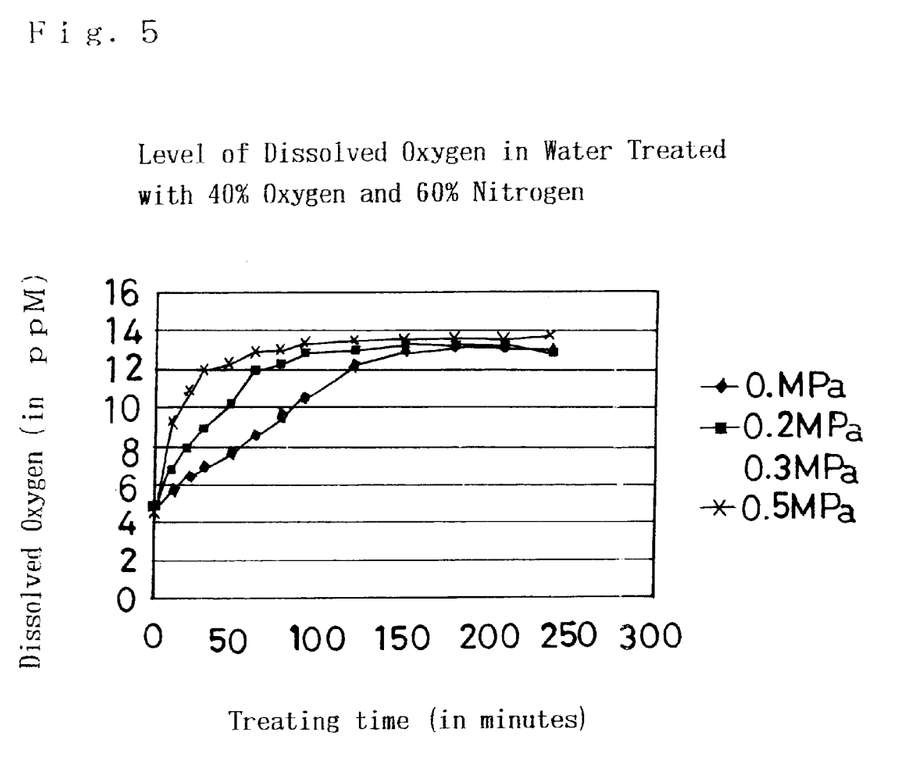
FIG. 5 is a graph showing a change in the level of dissolved oxygen in the water treated under pressure, with 100% oxygen added, according to the present invention.

FIGS. 2 to 5 show the test results on the water treated by an apparatus in which the present invention is embodied. These figures show the level of dissolved oxygen in treated water as measured with the oxygen-mixing ratio and the pressure in the pressure tank varied. FIG. 2 shows the level of dissolved oxygen in the water treated with air containing oxygen at a concentration of 20% by volume. FIG. 3 shows the level of dissolved oxygen in the water treated with the mixed gas comprising oxygen and nitrogen in the proportion of 30% to 70%. FIG. 4 shows the level of dissolved oxygen in the water treated with mixed gas comprising oxygen and nitrogen in the proportion of 40% to 60%. Finally, FIG. 5 shows the level of dissolved oxygen in the water treated with 100% oxygen. In any of the figures, curve 1 represents the case where there is no increase in the pressure of the relevant gas; curve 2 represents the case where such pressure is increased by 0.2 Mpa (megapascal kgf/cm$^2$); and curve 3 represents the case where such pressure is increased by 0.5 Mpa (megapascal kgf/cm$^2$)

From the test results, the following was found:

1. The level of dissolved oxygen in water varied in the proportion to the ratio of oxygen in the gas with which the water was treated. More specifically, under these such circumstances as ratio of oxygen in the gas was the higher, the level of dissolved oxygen in the water also became the higher. The highest level of dissolved oxygen came from the oxygen ratio of 100%, the second highest from 40%, next highest from 30%, and the lowest from 20%.
2. Changing the pressure in the pressure tank worked as a change in the upward movement of the level of dissolved oxygen in the treated water. More specifically, raising the pressure in the pressure tank stepped up the pace at which oxygen was dissolved in water. The largest enhancement of the upward movement came from the pressure in the pressure tank of 0.5 Mpa, the second largest from 0.3 Mpa, next largest from 0.2 Mpa, the smallest from the 0 Mpa.

These findings indicate that, by raising the pressure in the pressure tank while controlling the oxygen ratio of the gas to be injected in water, the pace at which oxygen is dissolved in water accelerates. In other words, by controlling the pressure in the pressure tank appropriately can control a level of oxygen dissolved in the water efficiently and accurately.

Although nitrogen gas is used as the gas supplied to the gas mixer 23 in this embodiment, there is a choice for the kind of gas for such purpose. By selecting an adequate kind of gas, water having any desired property ranging from highly oxidative one to highly reducing one can be obtained.

As described hereinbefore, the present invention is based on a pressure tank system to adjust the levels of oxidation-reduction potential and of dissolved oxygen in water. This allows an efficient use of gas such as oxygen and nitrogen.

Besides, a method of the present invention has the following advantages. As pressurized gas is used to have oxygen contained therein dissolve in water, the required time for treatment is reduced.

In addition, the pressure of the gas in the pressure tank is controlled by means of a liquid-level controller, and, therefore, the method is safe and the level of dissolved oxygen in treated water is kept steady.

In addition, the method of the present invention allows an automatic and unrestrained control of the level of oxidation-reduction potential and dissolved oxygen.

Additionally, in the method, the pressure tank is provided separately from the closed type tank, and, therefore, the pressure in the closed type tank may be reduced, resulting in a moderate manufacturing cost.

What is more, the mixed gas can be introduced in the closed type tank safely and reliably through the use of a negative pressure in the pressure pump.

Furthermore, setting up a storage tank separately from the closed type tank allows for taking out treated water for occasional use.

Still furthermore, the efficient activation of water can be realized by means of the infrared ray irradiation device and the activating ceramic.

All together, water treatment can be automatically performed, and the sterilization and multiplication of bacterial free from chemicals can be unrestrainedly carried out. The oxidation decomposition of organic substances can be promoted so that it becomes possible to grow plants and animals without using chemicals in such areas as livestock raising, tank farming, production of bean sprouts, and culture of mushrooms and the like. In the uses of the production of fermented soybeans and Japanese sake and beer brewing, a number of advantages are provided, including promoting the generation of germs, preventing the corruption of products after they are produced thereby allowing their preservation for a long time. Furthermore, an increase will take place in the multiplication rate of plants and animals, fodder and fertilizer efficiencies, resulting in the improved productivity.

In addition, by selecting an adequate kind of gas, the high quality treated water having any desired property ranging from highly oxidative one to highly reducing one can be obtained in safety and yet at a moderate cost.

Furthermore, the sterilizer used in the present invention combines the filtering device, the ceramic method and the ultraviolet ray method, with the result that the sterilizer is effective in deodorization as well as in the removal of organic and inorganic substances, and sterilization of bacteria.

Besides, the apparatus in which the present invention is embodies is easy in handling and does not take long for maintenance, and it also has an advantage of maintaining healthy and safe environment to live in.

What I claim is:

1. A method for automatically controlling the level of dissolved oxygen in water based on a pressure tank system equipped with a sterilizer comprising the steps of:

supplying crude water to a water retention chamber of a closed type tank by means of an automatic water supply device to obtain a prescribed amount of retained water;

mixing air or oxygen and nitrogen gas with the retained water in the closed type tank at a predetermined mixing ratio, and simultaneously feeding the gas mixed water into a circulation channel for circulating the retained water in the closed type tank through a pressure tank by means of a pressure pump;

circulating the retained water in the closed type tank in a circulation channel by means of a circulating pump, and activating the water by means of a ceramic pipe and an infrared ray irradiation device both of which are arranged in the circulation channel, thereby injecting the activated water into the retained water in the closed type tank by means of a gas injection nozzle;

adjusting the mixing ratio at which air or oxygen and nitrogen gas is mixed with the retained water in the closed type tank by means of a device for adjusting the levels of oxidation-reduction potential and dissolved oxygen according to the level detected by a sensor for detecting the levels of oxidation-reduction potential and dissolved oxygen, and changing the revolution number of the said pressure pump by means of a pump motor controller to change the pressure in the said pressure tank, and changing the revolution number of the said circulating pump to change the injecting pressure of the said gas injection nozzle;

filtering sludge by allowing the retained water in the closed tank to pass through a filtering device by means of a filtration pump, and further allowing the water to pass through a ceramic-filled device thereby adjusting oxidation-reduction potential of the water to a desired level and still further allowing the water to pass through an ultraviolet ray irradiation device to sterilization followed by bringing back the water to the closed type tank; and taking out the retained water in the closed type tank.

2. A method for automatically controlling the level of dissolved oxygen in water based on a pressure tank system equipped with a sterilizer as in claim 1, further comprising the steps of:

taking out the treated water in the closed type tank from the outlet port of treated water in the closed type tank and leading the treated water to a storage tank, the storage tank being equipped with a liquid-level adjusting means and a water supply pump controlled by the liquid-level adjusting means to maintain the amount of stored water in storage to a predetermined value; and, taking out the treated water from the storage tank.

3. A method for automatically controlling the level of dissolved oxygen in water based on a pressure tank system equipped with a sterilizer as in claim 1 or 2, wherein the mixed gas having air or oxygen and nitrogen gas mixed at a predetermined mixing ratio is sucked in the circulation channel through the use of a negative pressure in the pressure pump.

4. A method for automatically controlling the level of dissolved oxygen in water based on a pressure tank system equipped with a sterilizer as in claim 3, wherein adjusting the nitrogen/oxygen mixing ratio is used to control the level of dissolved oxygen in water.

5. A method for automatically controlling the level of dissolved oxygen in water based on a pressure tank system equipped with a sterilizer as in claim 1 or 2, wherein adjusting the nitrogen/oxygen mixing ratio is used to control the level of dissolved oxygen in water.

* * * * *